United States Patent [19]
Jung

[11] Patent Number: 5,579,050
[45] Date of Patent: Nov. 26, 1996

[54] APPARATUS FOR ENCODING A VIDEO SIGNAL USING A SEARCH GRID

[75] Inventor: Hae-Mook Jung, Seoul, Rep. of Korea

[73] Assignee: Daewoo Electronics Co., Ltd., Seoul, Rep. of Korea

[21] Appl. No.: 401,313

[22] Filed: Mar. 9, 1995

[51] Int. Cl.$^6$ ........................................ H04N 7/36
[52] U.S. Cl. .............................. 348/413; 348/699
[58] Field of Search ................................ 348/699, 716, 348/718, 400, 401, 402, 409, 411, 412, 413, 415

[56] References Cited

U.S. PATENT DOCUMENTS

| | | |
|---|---|---|
| 4,853,775 | 8/1989 | Rouvrais et al. . |
| 5,247,355 | 9/1993 | Frederiksen . |
| 5,408,269 | 4/1995 | Tsukagoshi ............................. 348/416 |
| 5,448,310 | 9/1995 | Kopet et al. ............................ 348/718 |

FOREIGN PATENT DOCUMENTS 0620685  10/1994  European Pat. Off. .

Primary Examiner—Amelia Au
Attorney, Agent, or Firm—Anderson, Kill & Olick P.C.

[57] ABSTRACT

An apparatus used in a motion-compensated video signal encoder for determining a predicted current frame based on a current frame and a previous frame of a digital video signal using a predetermined number of search grids, each search grid being a set of search blocks formed in the current frame, comprising: a motion estimator for detecting a set of motion vectors for each of the search grids, each of the motion vectors being determined by calculating an error between each of the search blocks and candidate blocks and selecting one candidate block which yields a minimum error; an error accumulator for accumulating each minimum error for all of the search blocks contained in each of the search grids to provide an accumulated minimum error signal for each of the search grids; a selector for comparing each of the search grids by using the accumulated error signal to provide a search grid selection signal; a switch, in response to the search grid selection signal, for selecting one set of motion vectors corresponding to the selected search grid; and a motion compensator for assigning the value of each of the pixels in the previous frame, which corresponds to one of the pixels in the current frame through the selected one set of motion vectors, as the value of said one of the pixels in the current frame.

2 Claims, 4 Drawing Sheets

APPARATUS FOR ENCODING A VIDEO SIGNAL USING A SEARCH GRID

FIELD OF THE INVENTION

The present invention relates to an apparatus for encoding a video signal; and, more particularly, to an apparatus for encoding a video signal using a motion prediction technique.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse coded modulation), two-dimensional DCT(discrete cosine transform), quantization of DCT coefficients, and VLC(variable length coding). The motion compensated DPCM is a process of estimating the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982).

The two-dimensional DCT, which reduces or makes use of spatial redundancies between image data, converts a block of digital image data, for example, a block of 8×8 pixels, into a set of transform coefficient data. This technique is described in Chen and Pratt, "Scene Adaptive Coder", *IEEE Transactions on Communications*, COM-32, No. 3(March 1984). By processing such transform coefficient data with a quantizer, zigzag scanning, and VLC, the amount of data to be transmitted can be effectively compressed.

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

There have been two basic approaches to estimate the displacement of pixels of an object. Generally, they can be classified into two types: one is a block-by-block estimation and the other is a pixel-by-pixel approach.

In the pixel-by-pixel approach, displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined at each and every pixel, it is virtually impossible to transmit all of the motion vectors to a receiver.

Using the block-by-block motion estimation, on the other hand, a current frame is divided into a plurality of search blocks. To determine a motion vector for a search block in the current frame, a similarity calculation is performed between the search block of the current frame and each of a plurality of equal-sized candidate blocks included in a generally larger search region within a previous frame. An error function such as the mean absolute error or mean square error is used to carry out the similarity measurement between the search block of the current frame and one of the candidate blocks in the search region. And a motion vector, by definition, represents the displacement between the search block and a candidate block which yields a minimum "error" or difference. However, in the block-by-block motion estimation, poor estimates may result if all pixels in the block do not move in a same way, to thereby lower the overall picture quality.

SUMMARY OF THE INVENTION

It is, therefore, a primary object of the invention to provide an improved motion prediction technique using a search grid in accordance with the present invention.

In accordance with the invention, there is provided an apparatus, for use in a motion-compensated video signal encoder, for determining a predicted current frame based on a current frame and a previous frame of a digital video signal using a predetermined number of search grids of an identical size, each search grid having a set of search blocks formed in the current frame, comprising:

means for detecting a set of motion vectors for each of the search grids, each of the motion vectors being determined by calculating an error between each of the search blocks and candidate blocks which are formed in the previous frame and selecting one candidate block which yields a minimum error;

means for accumulating the minimum errors for all of the search blocks contained in each of the search grids to provide an accumulated minimum error signal for each of the search grids;

means for comparing each of the search grids by using the accumulated error signal to provide a search grid selection signal indicating a selected search grid which produces a lowest accumulated minimum error;

means, in response to the search grid selection signal, for selecting one set of motion vectors corresponding to the selected search grid; and means for assigning the value of one of the pixels in the previous frame, which corresponds to one of the pixels in the current frame through the selected one set of motion vectors, as the value of said one of the pixels in the current frame, to thereby determine the predicted current frame.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
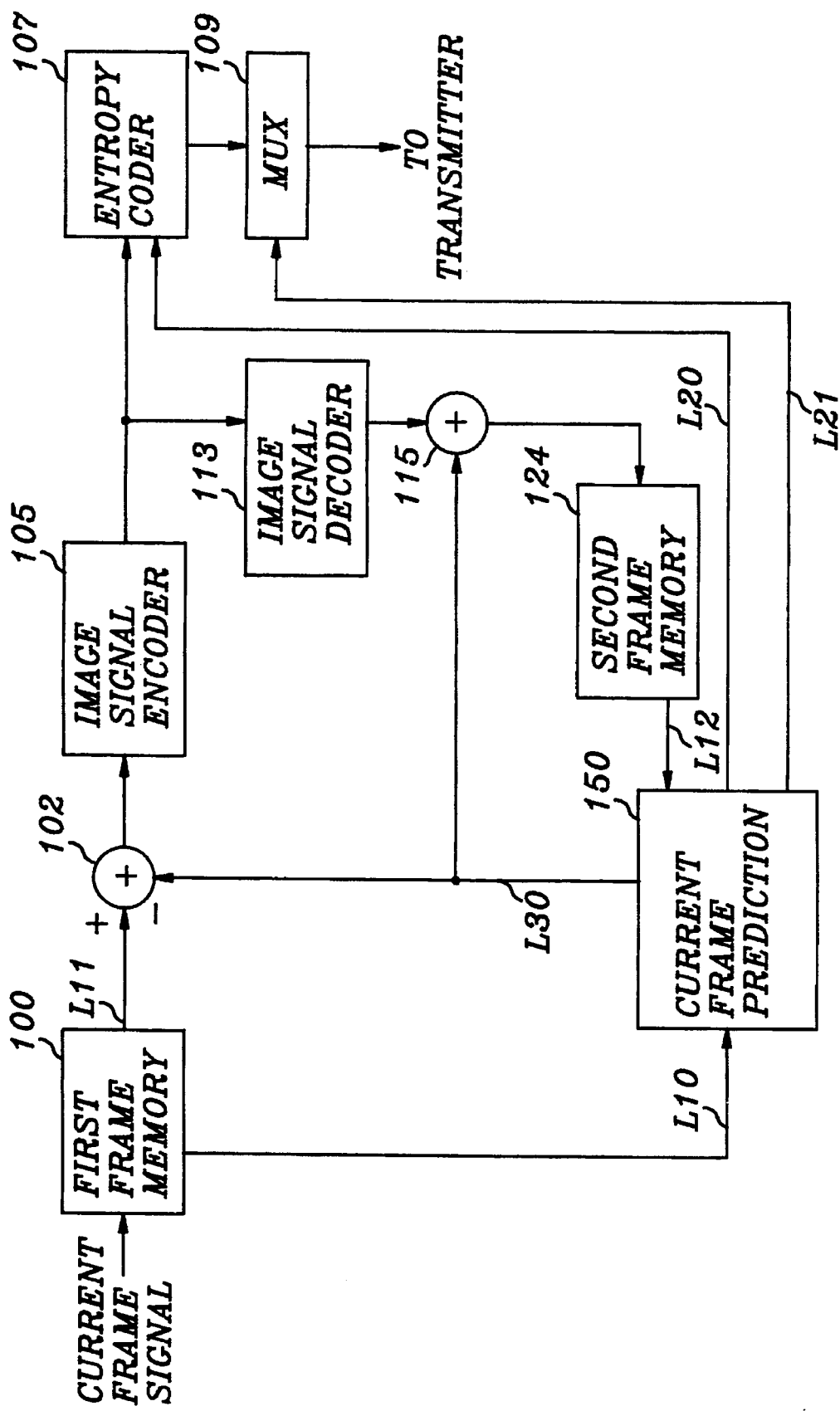
FIG. 1 is an image signal encoding apparatus having a current frame prediction block in accordance with the present invention.

FIG. 1 describes a preferred embodiment of an image signal encoding apparatus having a current frame prediction block of the present invention. As shown in FIG. 1, a current frame signal is stored in a first frame memory 100 which is connected to a subtractor 102 through a line L11 and to a current frame prediction block 150 through a line L10.

At the current frame prediction block 150, a current frame signal on the line L10 retrieved from the first frame memory 100 and a reconstructed previous frame signal on a line L12 from a second frame memory 124 are processed to generate a predicted current frame signal onto a line L30, a set of motion vectors onto a line L20 and information on a search grid onto a line L21. Definition of the search grid and details of the current frame prediction block 150 will be described with reference to FIGS. 2A, 2B, 2C and 3.

The predicted current frame signal on the line L30 is subtracted from a current frame signal on the line L11 at the subtractor 102, and the resultant data, i.e., an error signal denoting a differential pixel value, is dispatched to an image signal encoder 105, wherein the error signal is encoded into a set of quantized transform coefficients, e.g., by using a DCT and any of the known quantization methods. Thereafter, the quantized transform coefficients are transmitted to an entropy coder 107 and an image signal decoder 113. At the entropy coder 107, the quantized transform coefficients from the image signal encoder 105 and the motion vectors transmitted through the line L20 from the current frame prediction block 150 are coded together by using, e.g., a variable length coding technique. A multiplexer 109 multiplexes the output signal of the entropy coder 107 and the information of the search grid transmitted through the line L21 from the current frame prediction block 150. Thereafter, the multiplexed signal is provided to a transmitter(not shown) for the transmission thereof.

In the meantime, the image signal decoder 113 converts the quantized transform coefficients from the image signal encoder 105 back to a reconstructed error signal by employing an inverse quantization and an inverse discrete cosine transform.

The reconstructed error signal from the image signal decoder 113 and the predicted current frame signal on the line L30 from the current frame prediction block 150 are combined at an adder 115 to thereby provide a reconstructed current frame signal to be stored as a previous frame in the second frame memory 124.

Figure 2A:
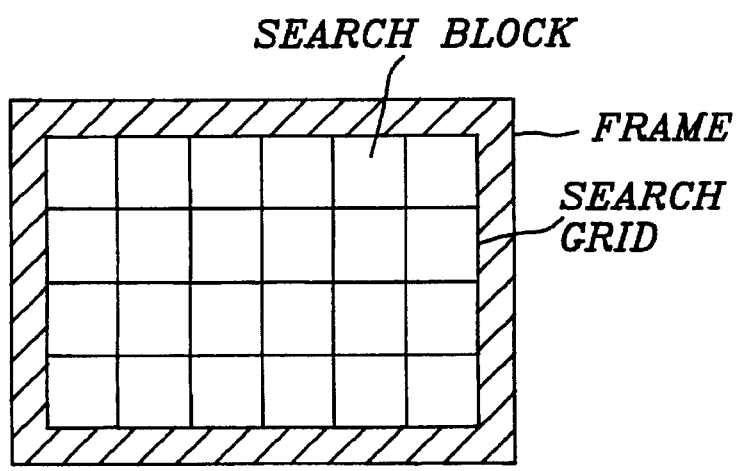
FIGS. 2A to 2C describe an exemplary frame to define search grids.
Figure 2B:
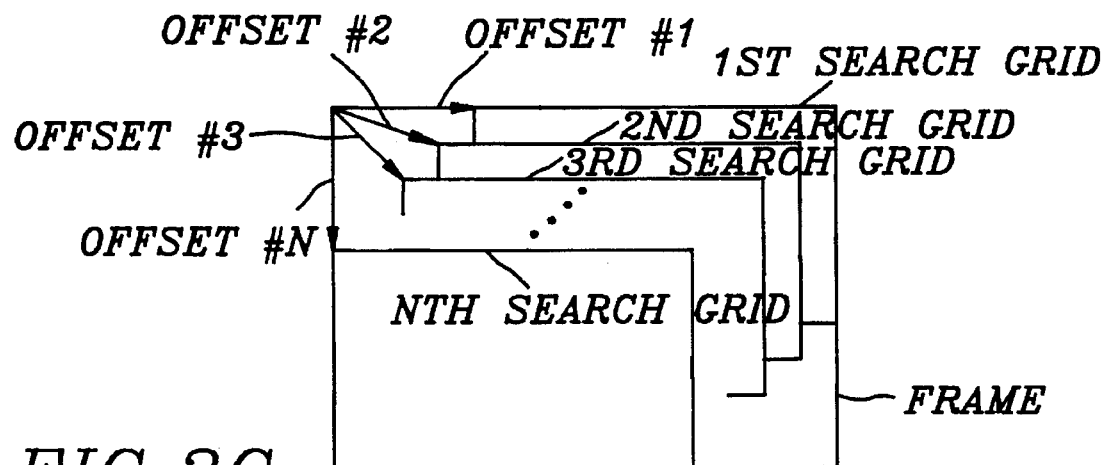

Referring to FIG. 2A, there is schematically illustrated an exemplary frame to define a search grid. The search grid is defined as a shiftable set of search blocks of an identical size. Each cell of the search grid is depicted as a search block. Since the search grid is movable within the limits of a margin(hatched area), there can be a plurality of shifted positions. For example, with reference to FIG. 2B, there are N number of shifted positions according to N offsets, each of which is a distance between a farmost top-left pixel of the frame and that of the search grid. For the purpose of illustration, the shifted position of offset #1 is named a first search grid, the shifted position of offset #2 is called a second search grid, and so on.

Figure 2C:
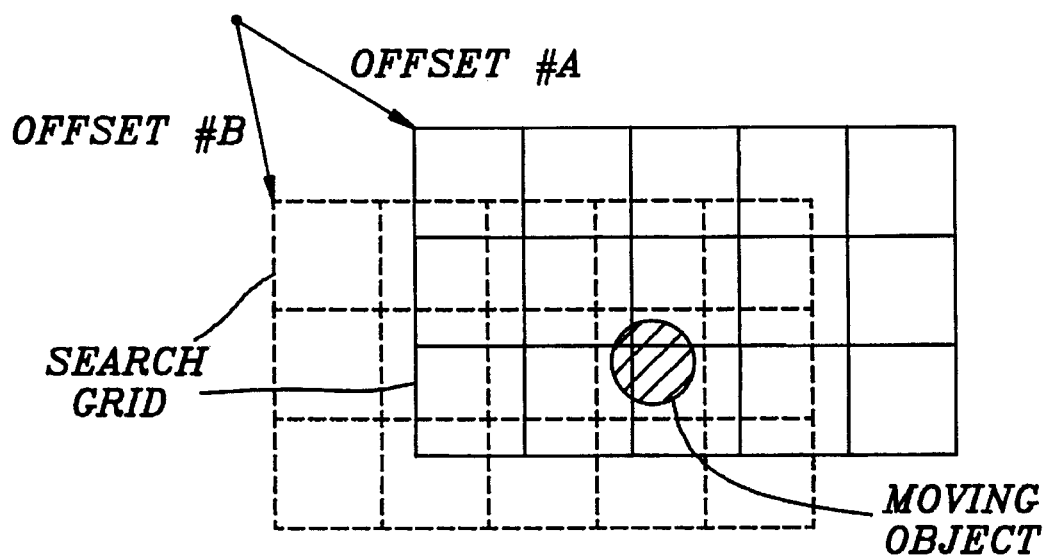

One of the advantages of employing the search grid is illustrated in FIG. 2C. That is, if a moving object(hatched area) is smaller than the size of a search block, and if a search grid which is capable of sufficiently embracing the moving object within a search block thereof is selected(for example, a search grid with an offset #B), it is possible to precisely represent a displacement of the moving object.

Figure 3:
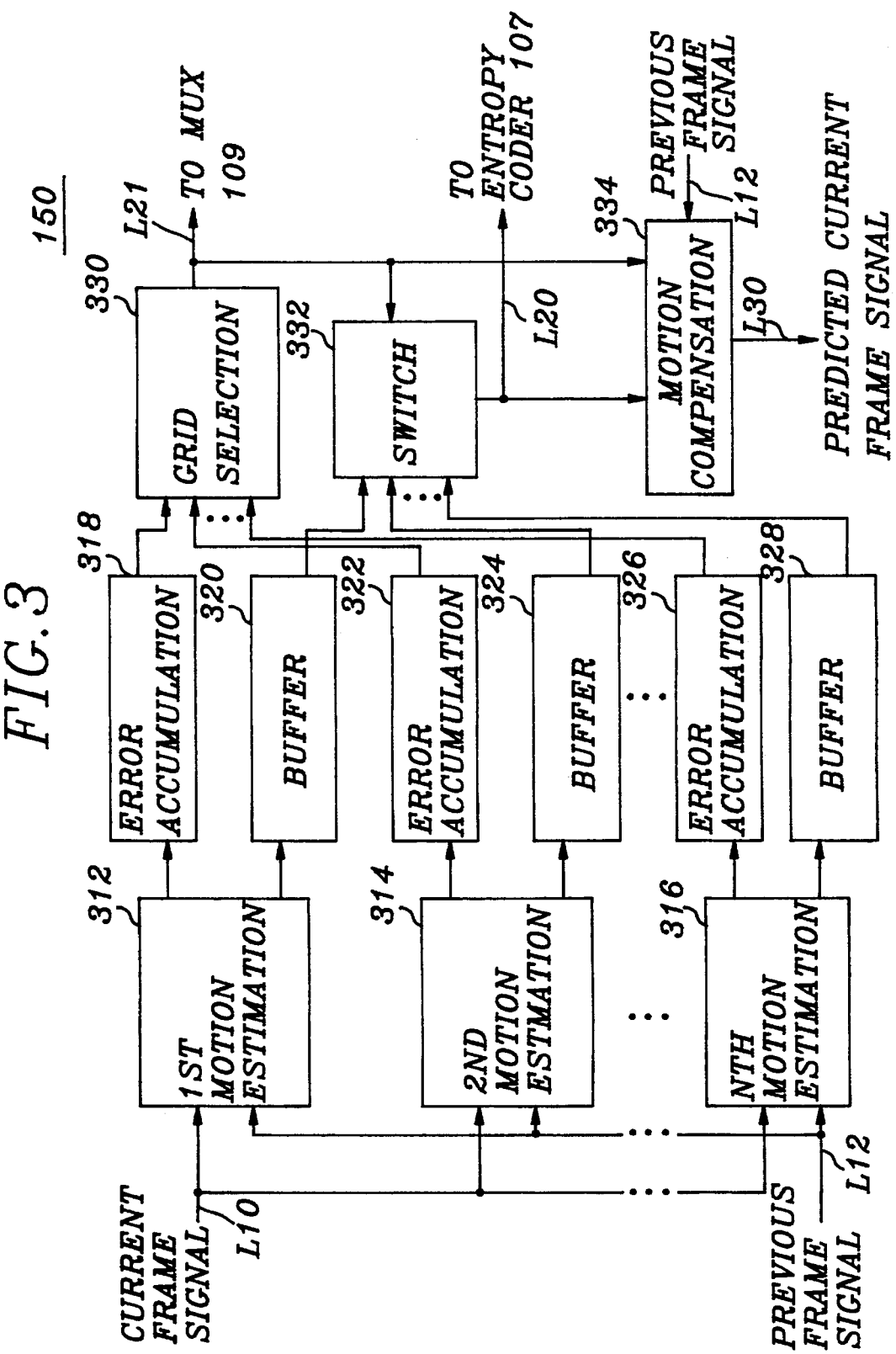
FIG. 3 shows a detailed block diagram of the current frame prediction block of FIG. 1.

Turning to FIG. 3, there are illustrated details of the current frame prediction block 150 shown in FIG. 1. The current frame signal on the line L10 and the previous frame signal on the line L12 are inputted to a number of motion estimation blocks 312, 314 and 316. The first motion estimation block 312 determines a first set of motion vectors for those search blocks contained in the first search grid shown in FIG. 2B. Each motion vector for the search blocks within the first search grid formed at the current frame is easily determined by using one of the well-known block matching algorithms. To determine a motion vector for a search block, for example, a similarity calculation is performed between the search block of the current frame and each of a plurality of equal-sized candidate blocks included in a generally larger search region within the previous frame. An error function such as the mean absolute error(MAE) or mean square error(MSE) is used to carry out the similarity measurement between the search block in the current frame and one of the candidate blocks in the search region. And then, the displacement between the search block and a candidate block which yields a minimum "error" or difference is determined as the motion vector of the search block. Similarly, a second motion estimation block 214 and an Nth motion estimation block 316 determine a second and an Nth sets of motion vectors for search blocks contained in the second and the Nth search grids, respectively.

Each of the motion estimation blocks 312, 314 and 316 generates two signals for every search block contained in each of the search grids, respectively: one is minimum error of a search block and a candidate block which yields a minimum error; and the other is a motion vector indicating the relative position between the search block and the candidate block which yields the minimum error.

Each of the error signals from the motion estimation blocks 312, 314 and 316 is provided to a number of error accumulation blocks 318, 322 and 326, respectively. And, each of the motion vectors from the motion estimation blocks 312, 314 and 316 is provided to a number of buffers 320, 324 and 328, respectively. At each of the error accumulation blocks 318, 322 and 326, inputted error signals for all of the search blocks in each grid are accumulated, while motion vectors for all of the search blocks in each grid are stored in each of the buffers 320, 324 and 328.

Each output signal from the error accumulation blocks 318, 322 and 326 is provided to a grid selection block 330. At the grid selection block 330, an accumulated minimum error value is selected to provide a selected grid information signal to the multiplexer 109 via the line L21 as shown in FIG. 1, a switch 332, and a motion compensation block 334. The switch 332, in response to the selected grid information signal, provides motion vectors stored in corresponding buffer to the entropy coder 107 through the line L20 as shown in FIG. 1 and to the motion compensation block 334.

At the motion compensation block 334, each value of the pixels to be contained in the predicted current frame signal is retrieved from the second frame memory 124(shown in FIG. 1) by using the selected grid information and the motion vectors for search blocks in the selected grid. On the other hand, each value of the pixels lying outside the search grid is retrieved from the second frame memory 124 by using zero motion vectors. The output of the motion compensation block 334 is provided on the line L30 as the predicted current frame signal to the subtractor 102 shown in FIG. 1.

Figure 4:
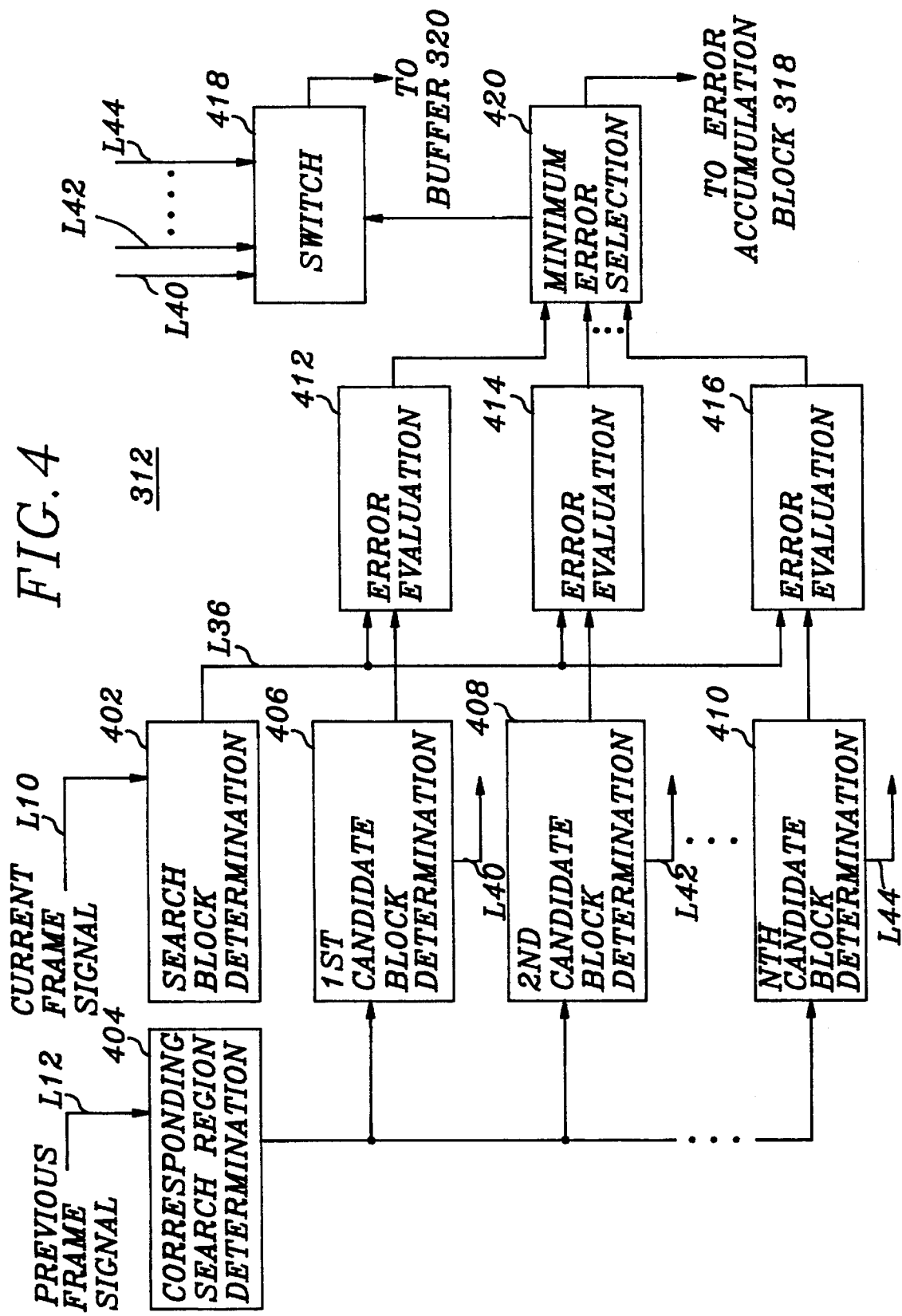
FIG. 4 illustrates a detailed block diagram of the motion estimation block of FIG. 3.

Referring to FIG. 4, description will be made with respect to a detailed operation of the motion estimation block 312. As shown in FIG. 4, the current frame signal on the line L10 is provided to a search block determination block 402 wherein one search block within the first search grid is determined. The output signal of the block 402 is provided through a line L36 to a plurality of error evaluation blocks 412, 414 and 416. On the other hand, the previous frame signal on the line L12 is provided to a search region determination block 404, wherein there is selected a search region which corresponds to the search block predetermined at the block 402. The output signal from the block 404 is provided to a plurality of candidate block determination blocks 406, 408 and 410. The block 406 determines a first candidate block out of all possible candidate blocks which are included in the search region. Similarly, the blocks 408 and 410 determine a second candidate block and an Nth candidate block, respectively. Each of the blocks 406, 408 and 410 generates two signals: one is a determined candidate block signal; and the other is a signal indicative of the relative position between the candidate block and the given search block, i.e., a motion vector. Each of the motion vectors from the blocks 406, 408 and 410 is outputted through the lines L40, L42 and L44 to a switch 418, respectively.

At the error evaluation blocks 412, 414 and 416, the given search block determined at the block 402 is compared with each of the candidate blocks to calculate the similarity therebetween. Generally, in carrying out the similarity measurement, an error function such as MAE or MSE is employed. Each output signal from the error evaluation blocks 412, 414 and 416 is provided to a minimum error selection block 420. The minimum error selection block 420 selects a minimum error to provide the selected minimum error and a switch control signal indicative of a motion vector corresponding to the selected minimum error to the error accumulation block 318 shown in FIG. 3 and the switch 418, respectively. The switch 418 selects, among the motion vectors provided on the lines L40, L42 and L44, a motion vector corresponding to the switch control signal and provides the motion vector to the buffer 320 as shown in FIG. 3

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus, for use in a motion-compensated video signal encoder, for determining a predicted current frame based on a current frame and a previous frame of a digital video signal using a predetermined number of search grids of an identical size, each of the search grids having a set of search blocks formed within the current frame, comprising:

means for detecting a set of motion vectors for each of the search grids, each of the motion vectors being determined by calculating an error between each of the search blocks and candidate blocks which are formed in the previous frame and selecting one candidate block which yields a minimum error;

means for accumulating the minimum errors for all of the search blocks contained in each of the search grids to provide an accumulated minimum error signal for each of the search grids;

means for comparing the search grids by using the accumulated error signals to provide a search grid selection signal for selecting a search grid which produces a lowest accumulated minimum error;

means, in response to the search grid selection signal, for selecting one set of motion vectors corresponding to the selected search grid; and means for assigning the value of one of the pixels in the previous frame, which corresponds to one of the pixels in the current frame through the selected one set of motion vectors, as the value of said one of the pixels in the current frame, to thereby determine the predicted current frame.

2. The apparatus in claim 1, wherein said assigning means includes means for assigning zero valued motion vectors for pixels located outside of the selected search grid.

* * * * *